US007031250B2

(12) United States Patent
Vandenameele-Lepla

(10) Patent No.: US 7,031,250 B2
(45) Date of Patent: Apr. 18, 2006

(54) METHOD AND APPARATUS FOR CHANNEL ESTIMATION

(75) Inventor: Patrick Vandenameele-Lepla, Bertem (BE)

(73) Assignee: RF Micro Devices, Inc., Greensboro, NC (US)

( * ) Notice: Subject to any disclaimer, the term of this patent is extended or adjusted under 35 U.S.C. 154(b) by 1020 days.

(21) Appl. No.: 09/966,419

(22) Filed: Sep. 27, 2001

(65) Prior Publication Data

US 2003/0058787 A1 Mar. 27, 2003

(51) Int. Cl.
*H04J 11/00* (2006.01)
*H04J 1/00* (2006.01)
*H04B 1/69* (2006.01)
*H04K 1/10* (2006.01)

(52) U.S. Cl. ...................... 370/206; 370/482; 375/152; 375/260

(58) Field of Classification Search ........ 370/206–208, 370/482; 375/152, 260
See application file for complete search history.

(56) References Cited

U.S. PATENT DOCUMENTS

| 5,282,222 | A | | 1/1994 | Fattouche et al. |
| 5,487,069 | A | | 1/1996 | O'Sullivan et al. |
| 5,796,814 | A | * | 8/1998 | Brajal et al. |
| 5,912,876 | A | | 6/1999 | H'mimy |
| 5,995,499 | A | * | 11/1999 | Hottinen et al. |
| 6,002,716 | A | | 12/1999 | Meyer et al. |
| 6,061,327 | A | | 5/2000 | Demoulin et al. |
| 6,141,393 | A | | 10/2000 | Thomas et al. |
| 6,320,901 | B1 | * | 11/2001 | Arad et al. |
| 6,442,211 | B1 | * | 8/2002 | Hampel et al. |
| 6,687,228 | B1 | * | 2/2004 | Fichou et al. ............... 370/232 |
| 6,731,639 | B1 | * | 5/2004 | Ors et al. .............. 370/395.51 |
| 6,765,969 | B1 | * | 7/2004 | Vook et al. |
| 6,826,240 | B1 | * | 11/2004 | Thomas et al. |
| 6,856,649 | B1 | * | 2/2005 | Birru |
| 2002/0021773 | A1 | * | 2/2002 | Henriksson |
| 2002/0027957 | A1 | * | 3/2002 | Paulraj et al. |
| 2002/0034161 | A1 | * | 3/2002 | Deneire et al. ............ 370/210 |
| 2002/0039383 | A1 | * | 4/2002 | Zhu et al. |
| 2002/0122499 | A1 | * | 9/2002 | Kannan et al. |
| 2002/0181390 | A1 | * | 12/2002 | Mody et al. ................ 370/208 |
| 2003/0026223 | A1 | * | 2/2003 | Eriksson et al. |
| 2005/0002468 | A1 | * | 1/2005 | Walton et al. |

FOREIGN PATENT DOCUMENTS

| EP | 1 030 489 A1 | 8/2000 |
| EP | 1 030489 A1 | 8/2000 |

OTHER PUBLICATIONS

Y. Li, L. J. Cimini and N.R. Sollenberger, "Robust Channel Estimation for OFDM Systems with Rapid Dispersive Fading Channels," *IEEE Trans. Commun.*, vol. 46(7), pp. 903-915, Jul. 1998.

(Continued)

*Primary Examiner*—John Pezzlo
*Assistant Examiner*—Hong Sol Cho
(74) *Attorney, Agent, or Firm*—Withrow & Terranova, PLLC

(57) ABSTRACT

Various methods and systems efficiently implement broadband multi-carrier communication systems. The invention exploits the structural properties of a frequency-domain channel estimator and transforms it into the time domain. This allows the sharing of certain blocks of hardware (e.g., matched filters otherwise used for timing acquisition) which results in significant reduction of complexity.

30 Claims, 3 Drawing Sheets

OTHER PUBLICATIONS

O. Edfords, et al., "OFDM Channel Estimation by Singular Value Decomposition", *IEEE Trans. Commun.*, vol. 46(7), pp. 931-939, Jul. 1998.

M. H. Hsieh and C.H. Wei, "Channel Estimation for OFDM Systems based on Comp-Type Pilot Arrangement in Frequency Selective Fading Channels", *IEEE Trans. Consumer Electr.*, vol. 44(1), pp. 217-225, Feb. 1998.

Ye Li, et al., "Channel Estimation for OFDM Systems with Transmitter Diversity in Mobile Wireless Channels", *IEEE J. Select. Areas Commun.*, vol. 17(3), pp. 461-471, Mar. 1999.

W. G. Jeon, et al. "An Equalization Technique for Orthogonal Frequency-Division Multiplexing Systems in Time-Variant Multipath Channels" *IEEE Trans. Commun.*, vol. 47(1), pp. 27-32, Jan. 1999.

Marco Luise, et al. "Blind Equlzation/Detection for OFDM Signals over Frequency-Selective Channels", *IEEE J. Select. Areas Commun.*, vol. 16(9), pp. 1568-1578, Oct. 1998.

J. Ahn, et al. "Frequency Domain Equalisation of OFDM Signals over Frequency Nonselective Rayleigh Fading Channels" *Electronics Letter.*, vol. 29(16), pp. 1476-1477, pp. 1476-1477, Aug. 5, 1993.

Y. Sun and L. Tong, "Bandwidth efficient wireless OFDM", *Proc. 32nd Asilomar Conference on Signals, Systems and Computers, Pacific Grove, CA*, pp. 78-82, Nov. 1-4, 1998.

Y. Sun and L. Tong. "Channel Equalization using one-tap DFE for wirelss OFDM Systems with ICI and ISI", *Proc. 2nd IEEE Signal Processing Workshop on Signal Processing Advances in wireless communications, SPAWC'99*, pp. 146-149, May 9-12, 1999.

Y. Sun and L. Tong, "A lower ordered HMM approach to blind sequence estimation" *Proc. Conference on Military Communications, MILCOM'98, Bedford, MA*, pp. 847-851, Oct. 18-21, 1998.

Y. Sun and L. Tong, "A Channel-Whitening Blind Sequence Estimation Algorithm" *Proc. 1998 IEEE International Symposium on Information Theory, ISIT'98, MIT*, p. 180, Aug. 16-21-, 1998.

A. J. Redfem and G. T. Zhou, "Nonlinear Channel Identification and Equalization for OFDM Systems" *Proc. Intl. Conference on Acoustics, Speech, and Signal Processing (ICASSP'98) Seattle, WA*, pp. 3521-3524.

Simon Armour, et al. "Complexity Evaluation for the Implementation of a Pre-FFT Equalizer in and OFDM Receiver", *IEEE Int'l Conf. on Consumer Electronics*, pp. 16-17, Jun. 2000.

A. Papathanassiou, et al. Novel Time-Domain Channel Estimation and Equalization for OFDM-based Wireless Indoor Communications Systems, *Information Society Technologies, Mobile Summit 2000*, Oct. 2000.

Jukka Rinna, et al. "An Improved Equalizing Scheme for Orthogonal Frequency Division Multiplexing Systems for Time-Variant Channels" *IEEE*, pp. 879-883, 1995.

P. Vandenameele, "Space Division Multiple Access for Wireless Local Area Networks" *Katholieke Universiteit Leuven*, Oct. 2000.

Vandenameele, "Space Division Multiple Access for Wireless Local Area Networks," *IMEC*, Oct. 2000, Catholic University, Leuven Belgium.

U, et al., "Robust Channel Estimation for OFDM Systems with Rapid Dispersive Fading Channels," *IEEE Transactions on Communications*, Jul. 1998, vol. 48, No. 7, pp. 902-915.

Jeon, et al., "An Equalization Technique for Orthogonal Frequency-Division Multiplexing Systems in Time-Variant Multipath Channels," *IEEE Transactions on Communications*, Jan. 1999, vol. 47, No. 1, pp. 27-32.

Luise, et al., "Blind Equalization Detection for OFDM Signals over Frequency-Selective Channels," *IEEE Journal on Selected Areas in Communications*, Oct. 1998, vol. 16, No. 8, pp. 1568-1578.

Hsieh, et al., "Channel Estimation for OFDM Systems Based on Comb-Type Pilot Arrangement in Frequency Selective Fading Channels," *IEEE Transactions on Consumer Electronics*, Feb. 1998. vol. 44, No. 1, pp. 217-225.

U, et al., "Channel Estimation for OFDM Systems with Transmitter Diversity in Mobile Wireless Channels," *IEEE Journal on Selected Areas in Communications*, Mar. 1999, vol. 17, No. 3, pp. 461-471.

Edfors, et al., "OFDM Channel Estimation by Singular Value Decomposition," *IEEE Transactions on Communications*, Jul. 1998, vol. 48, No. 7, pp. 931-939.

Sun, et al., "Channel-Whitening Blind Sequence Estimation Algorithm," ISIT Aug. 16-21, 1998, in *Proc. 1998 IEEE International Symposium on Information Theory*, MIT, Cambridge, MA, IEEE, 1998, vol.$_{13}$. No. $_{13}$. p. 180.

Sun, et al., "A Lower Ordered HMM Approach to Blind Sequence Estimation," IEEE, 1998, vol.$_{13}$. No.$_{13}$. pp. 847-851.

Sun, et al., "Channel Equalization Using One-Tap DFE for Wireless OFDM Systems with ICI and ISI," *In Proc. 2nd IEEE Signal Processing Worshop on Signal Processing Advances in Wireless Communications*, SPA WC'99 Annapolis, MD, May 9-12, 1999, IEEE, 1999, vol.$_{13}$. No.$_{13}$, pp. 146-149.

Ahn, et al., "Frequecy Domain Equalisation of OFDM Signals over Frequency Nonselective Rayleigh Fading Channels," *Electronics Letters*, Aug. 5th, 1993, vol. 29, No. 16, pp. 1476-1477.

Sun, "Bandwidth Efficient Wireless OFDM," *in Proc. 32nd Asilomar Conference on Signals, Systems, and Computers*, Pacific Grove, CA, No. 1-4, 1998, IEEE, vol.$_{13}$, No.$_{13}$, pp. 78-82.

Redfern, et al., "Nonlinear Channel Identification and Equalization for OFDM Systems," *in Proc. Intl. Conference on Acoustic, Speech, and Signal Processing*, ICASSP '98, Seattle, WA, IEEE, vol.$_{13}$, No.$_{13}$, 1998, pp. 3521-3524.

Rinne, et al., "An Improved Equalizing Scheme for Orthogonal Frequency Division Multiplexing Systems for Time-Variant Channels," *in Proc. IEEE Global Telecommmunications Conference Globecom '95*,Singapore. IEEE, vol.$_{13}$, No.$_{13}$, 1995, pp. 879-883.

Armour, et al., "Complexity Evaluation for Implementation for Implementation of a Pre-FFT Equalizer in an OFOM Receiver," *IEEE International Conference on Consumer Electronics*, Jun. 2000, IEEE, vol.$_{13}$, No.$_{13}$, 2000, pp. 16-17.

Papathananassiou, et al., "Novel Time-Domain Channel Estimation and Equalization for OFDM-Based Wireless Indoor Communications Systems," *Information Society Technologies, Mobile Summut 2000*, Oct. 2000.

* cited by examiner

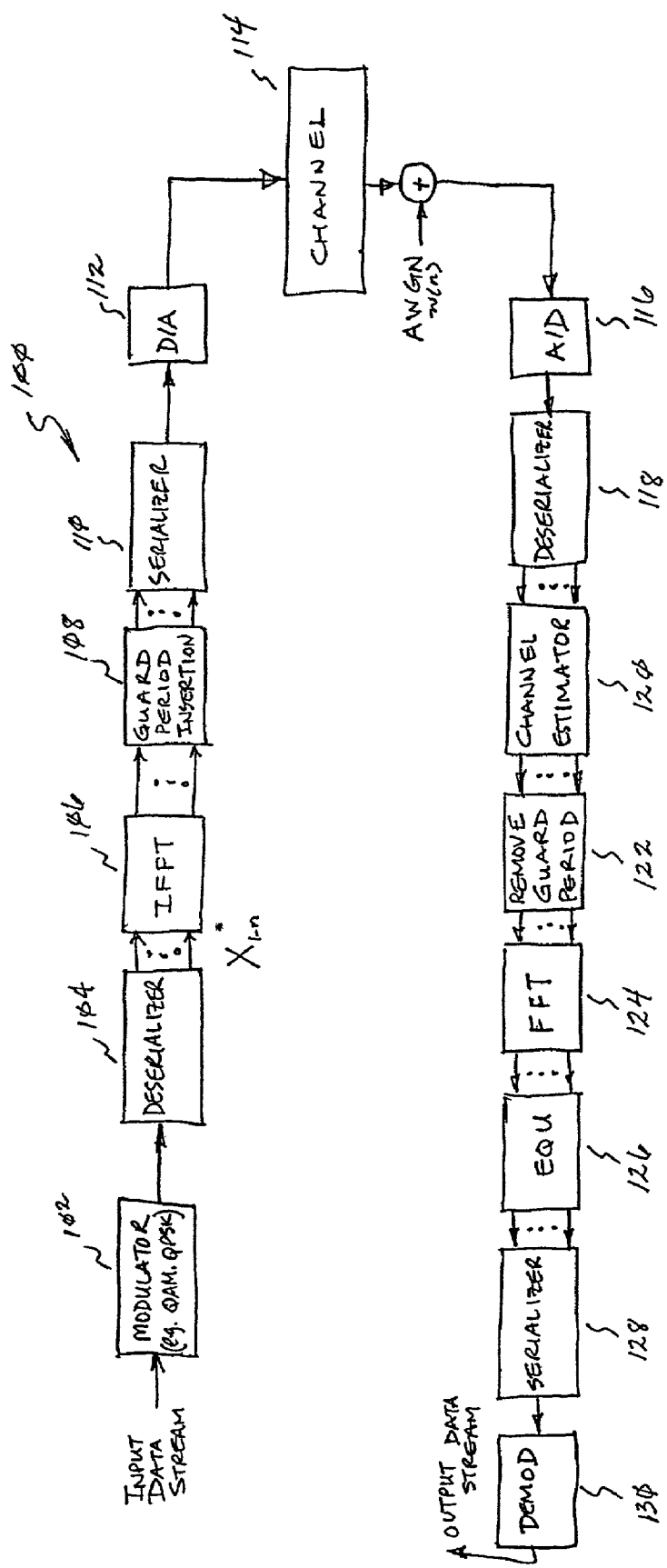
—FIGURE 1—

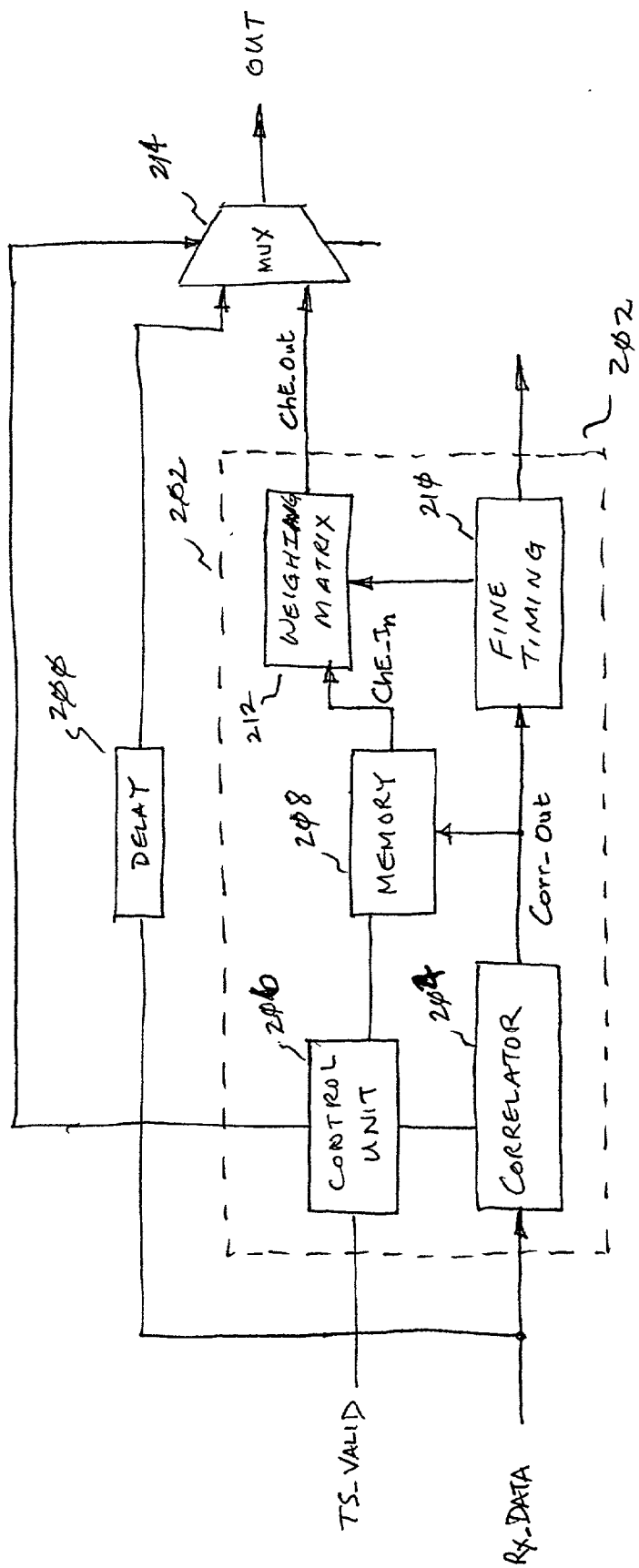
-FIGURE 2-

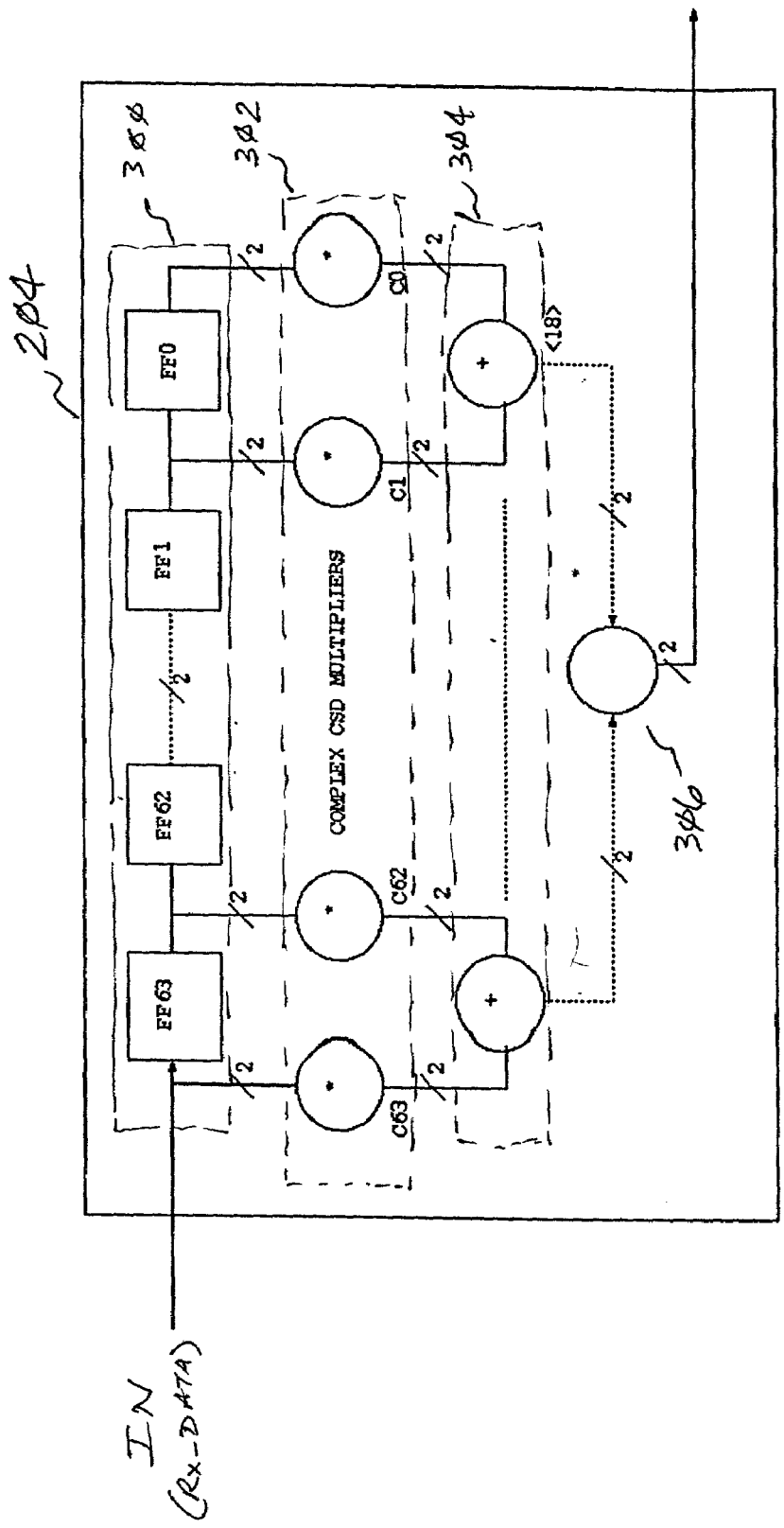
− FIGURE 3 −

METHOD AND APPARATUS FOR CHANNEL ESTIMATION

BACKGROUND OF THE INVENTION

The present invention relates in general to communication systems, and in particular to methods and systems for improving various aspects of communication systems utilizing multi-carrier transmission techniques such as orthogonal frequency division multiplexing.

Wireless personal communication devices have proliferated over the past several years. Integration of more functionality such as multimedia capabilities into these devices has created an ever increasing demand for enhanced broadband communication methodologies. Unlike satellite communication where there is a single direct path from a transmitter to a receiver, personal wireless communication devices must operate in a multi-path environment. Multi-path propagation is caused by the transmitted signal reflecting off of objects such as buildings, automobiles, trees, etc., that may be encountered along the signal path. This results in the receiver receiving multiple copies of the transmitted signal each having different delay, attenuation and phase shift depending on the length of the path and the material composition of the objects along the path. The interference between the multiple versions of the transmit signal, referred to as inter-symbol interference (ISI), is a common problem that can severely distort the received signal.

Orthogonal frequency division multiplexing (OFDM) is one type of multi-carrier data transmission technique that has had some success in addressing ISI, distortion and other problems associated with multi-path environments. OFDM divides the available spectrum into multiple carriers, each one being modulated by a low rate data stream. Multiple user access is achieved by subdividing the available bandwidth into multiple channels, that are then allocated to users. The orthogonality of the carriers refers to the fact that each carrier has an integer number of cycles over a symbol period. Due to this, the spectrum of each carrier has a zero at the center frequency of each of the other carriers in the system. This results in no interference between the carriers, allowing them to be spaced as close as theoretically possible. Each carrier in an OFDM signal has a very narrow bandwidth, thus the resulting symbol rate is low. This results in the signal having a high tolerance to multi-path delay spread, as the delay spread must be very long to cause significant inter-symbol interference. Coded orthogonal frequency division multiplexing (COFDM) is the same as OFDM except that forward error correction is applied to the signal before transmission. This is to overcome errors in the transmission due to lost carriers from frequency selective fading, channel noise and other propagation effects. In the description presented herein, the terms OFDM and COFDM are used interchangeably.

In OFDM the sub-carrier pulse used for transmission is chosen to be rectangular. This allows the task of pulse forming and modulation to be performed by an inverse discrete Fourier transform (IDFT). IDFT is implemented very efficiently as an inverse fast Fourier transform (IFFT) which would then require only an FFT at the receiver end to reverse the process. In addition to the FFT, the receiver must perform channel equalization to compensate for the channel transfer function. In OFDM, channel equalization is typically performed in frequency domain to enable the estimation of channel frequency response. Several methods have been proposed for channel estimation and equalization for use with OFDM. One method transmits a known sequence (e.g., all "1's") and any deviations from the expected received data is attributed to the channel response. This method, however, is quite susceptible to noise and yields varying channel estimates due to noise. It therefore requires additional circuitry for noise carrier suppression. Another method uses conventional least mean square algorithms and additional tuning coefficients to speed up the manipulation of the equalizer. The implementation of such equalizer is however quite complex and hardware intensive.

BRIEF SUMMARY OF THE INVENTION

The present invention provides various methods and systems that efficiently implement broadband multi-carrier communication systems. Broadly, in one embodiment, the invention exploits the structural properties of a frequency-domain channel estimator and transforms it into the time domain. This allows the sharing of certain blocks of hardware (e.g., matched filters otherwise used for timing acquisition) which results in significant reduction of complexity. Specifically, the invention performs the channel estimation function on time-domain signals before the FFT stage in the receiver. Thus the division of the received signal by the channel estimation training sequence, which was previously performed in frequency domain, is converted to convolution in time domain. In case of an at least partially cyclic time-domain channel estimation training sequence, this convolution can be implemented by a non-cyclic convolution or matched filter in the time-domain, of the type used for timing extraction purposes, allowing the sharing of the hardware. This and other advantages flow from the method and apparatus of the present invention.

Accordingly, in one embodiment, the present invention provides a method for communicating data between a transmitter and a receiver separated by a channel, the method including, at the transmitter end: generating a plurality of modulated sub-carrier signals based on the data; transforming the plurality of modulated sub-carrier signals into a plurality of time-domain signals; transmitting the plurality of time-domain signals across the channel; and at the receiver end: receiving the plurality of time-domain signals; estimating a channel transfer function using a subset of the plurality of time-domain signals; transforming the plurality of time-domain signals into frequency domain; and compensating for the channel transfer function using the estimated channel transfer function. The subset of the plurality of time-domain signals includes training symbols that are embedded into the data for channel estimation purposes. The estimating step includes performing a convolution of the training sequence. The estimating step further includes processing a weighing matrix in time domain. The processing of the weighing matrix includes performing a multiplication of the weighing matrix with the convolved training sequence. The convolution is performed as a cyclic convolution or a non-cyclic convolution in case of an at least partially cyclic training sequence. The estimating further includes a step of determining an optimum time window within which the multiplication of the weighing matrix yields the optimum channel estimation performance.

In another embodiment, the present invention provides in a multi-carrier data communication system a receiver that includes a channel estimator that receives a multi-carrier time-domain signal and generates a plurality of channel estimates at its output; a time-domain to frequency-domain transform unit coupled to the output of the channels estimator and configured to convert the multi-carrier time-domain signal and the channel estimates from time domain into frequency domain; and an equalizer coupled to an output of the transform unit and configured to compensate the multi-carrier signal for channel effects using the channel estimates. The channel estimator includes a correlator that receives a training sequence embedded in the multi-carrier time-domain signal, and performs a convolution operation on the training sequence; and a weighing matrix that is coupled to the correlator, and is configured to multiply a channel estimation weighing matrix with the output of the correlator.

In yet another embodiment, the present invention provides a channel estimation method including: receiving a time-domain signal representing a channel training sequence; performing a convolution function on the training sequence; extracting a time window within which the received signal has optimum amount of energy; and multiplying a weighing matrix with the convolved training sequence to arrive at channel estimates. The multiplying occurs during the time window extracted by the extracting step.

The following detailed description along with the accompanying drawings will provide a better understanding of the nature and advantages of the present invention.

BRIEF DESCRIPTION OF THE DRAWINGS

FIG. 1 is a block diagram of an OFDM system within which an exemplary embodiment of the present invention is implemented;

FIG. 2 is a block diagram of channel estimator according to one embodiment of the present invention; and FIG. 3 is a simplified block diagram showing an exemplary implementation for a correlator used in the channel estimator according to the present invention.

DETAILED DESCRIPTION OF THE INVENTION

In multi-carrier data communication systems such as OFDM, channel equalization is accomplished by first estimating and then compensating for the channel frequency response at the receiver end. How well the received signal is equalized is therefore directly dependent on the accuracy of the channel estimates. Attempts to improve the accuracy of channel estimation has generally resulted in techniques with increasing complexity. A novel maximum-likelihood estimation algorithm that reduces the complexity to some degree has been presented by Patrick Vandenameele in his PhD dissertation entitled "Space Division Multiple Access for Wireless Local Area Networks," October 2000, Katholieke Universiteit Leuven, which is hereby incorporated by reference in its entirety. This algorithm takes advantage of the existing correlation between the sub-carriers to extract the channel noise and performs some post-processing of the initial estimates to improve their accuracy. To avoid correlation in frequency domain which would require processing of large matrices, the post-processing is performed in time domain to derive a maximum likelihood (ML) estimator. According to this method, an initial set of channel estimates are arrived at in frequency-domain by dividing the received frequency-domain signals by their corresponding frequency-domain training symbols. The initial frequency domain channel estimates go through an IFFT and are transformed into time domain. A weighing matrix that accounts for the finite time response of the channel and the position of the sub-carriers in the frequency domain, is then processed in time domain to determine the maximum likelihood time domain estimates. This is then followed by an FFT to produce frequency domain channel estimates with reduced noise that are fed back to the equalizer. While this approach has reduced the complexity to some degree it still remains compute intensive and complex.

The present invention significantly reduces the level of complexity in channel estimation by exploiting the structural properties of a frequency-domain channel estimator and transforming it into the time domain. Referring to FIG. 1, there is shown a simplified block diagram of a communication system 100 implementing OFDM according to an exemplary embodiment of the present invention. A modulator 102 first converts the input data stream into a multi-amplitude multi-phase modulated signal. A deserializer (or serial-to-parallel converter) 104 converts the modulated signal into multiple sub-carriers X1 to Xn. An IFFT block 106 transforms the frequency domain signals X1–Xn into time domain signals x1 to xn. To preserve orthogonality between the carriers and to minimize ISI caused by multi-path signals, a guard period is inserted by block 108 between transmitted symbols. The guard period allows time for multi-path signals from the pervious symbol to die away before the information from the current symbol is gathered. In this embodiment a cyclic extension of the symbol is used as the guard period. By replicating the end of the symbol waveform at the start of the symbol as the guard period, the orthogonality of the OFDM waveform is maintained, even in multi-path channel environments. The cyclic extended symbol is serialized by block 110 and then converted into an analog signal by digital-to-analog (D/A) converter 112, and transmitted over the channel. Channel 114 is a multi-path channel with additive white Gaussian noise (QWGN).

At the receiver end, an analog-to-digital (A/D) converter 116 receives the analog signal and converts it into a digital signal. The digital time-domain signal is first deserialized (block 118) and then fed into a channel estimator 120. Channel estimator 120 processes the training sequence that is embedded in the data stream at the transmitter end, and arrives at the channel estimates. The channel estimates are added back into the data and applied to block 122 that removes the guard period from the time-domain signal. With the guard period removed, FFT block 124 transforms the time-domain signal into a frequency domain signal. An equalizer EQU 126 receives the output of FFT 124 and, using the channel estimates derived by channel estimator 120, generates equalized output signal. The signal is then serialized by block 128 and demodulated by block 130 to generate the output data stream.

One advantage of this implementation is realized by the fact that channel estimation (block 120) is performed on the time-domain received signal, i.e. before the signal goes though FFT block 124. This eliminates the need for additional IFFT/FFT blocks that were required by the previous implementations in order to process the post-FFT training sequence in time domain. FFT block 124 in the present invention, which is present in any OFDM system, is reused to transform the time-domain channel estimates into frequency domain. Another advantage of this specific embodiment of the present invention resides in the fact that the division operation performed for channel estimation converts to a cyclic convolution operation in time domain. Furthermore, because the training sequence can be chosen to be cyclic, the cyclic convolution can be performed by a non-cyclic convolution. This non-cyclic convolution can then be implemented by a matched filter. According to this embodiment of the present invention, the same windowed matched filter that is used to extract signal timing for synchronization purposes can be reused for channel estimation. This aspect of the invention is described in greater detail below in connection with FIGS. 2 and 3.

It is to be understood that the data communication system as depicted in FIG. 1 is for illustrative purposes only and that depending on the implementation it may include fewer or additional functional blocks, and that many variations are possible. For example, functional blocks addressing timing synchronization including determination of carrier frequency offset and clock frequency offset have not been shown in FIG. 1. The order in which some of the blocks appear in the transmitter or receiver may vary depending on the implementation. For example, in some implementations the serial-to-parallel conversion may take place after the modulation in the transmitter. Also, in some embodiments, to facilitate implementation, the actual weighing matrix used can differ from the one obtained using the exact mathematics of the type described in the above-referenced PhD dissertation.

Focusing on the receiver end of system 100, FIG. 2 shows one implementation for channel estimator 120 according to an exemplary embodiment of the present invention. The channel estimator includes two paths, one for the actual data (or the payload) that goes through a delay unit 200, and another for the training sequence (TS) that goes through the estimation module 202. Estimation module 202 includes a correlator 204 that operates on the training sequence TS embedded in the received data stream RX_DATA. The timing of the arrival of the training sequence at the input of correlator 204 is indicated by the signal TS_VALID. Estimation module 202 includes a control unit 206 that receives the signal TS_VALID and enables correlator 204 to operate on the training signal at its input. The output of correlator 204 connects to a memory unit 208 as well as a fine timing block 210. A weighing matrix block 212 receives data from memory 208 as well as timing signal from fine timing block 210, and supplies its output to one input of multiplexer (or MUX) 214. The other input of MUX 214 connects to the output of delay unit 200, while its select input receives a control signal from control unit 206. Control unit 206 controls the flow of signals within channel estimator 120.

In operation, correlator 204 performs two functions: initial phase timing recovery for synchronization purposes, and convolution. The training sequence TS is read in by correlator 202 on the receipt of the TS_VALID signal from controller 206. In this embodiment, a matched filter is used as correlator 202 such that when stimulated by the receive signal it identifies the energy peaks of the signal. This enables the correlator to extract the initial phase timing of the TS. A matched filter can also be used to perform convolution. Since the division function that is required for estimation purposes is implemented by a convolution in time domain, and because of the cyclic nature of the TS, advantageously, the same matched filter that performs the timing recovery is used, according to this embodiment of the invention, for estimation purposes. There are various types of known matched filter implementations. In a specific embodiment described in further detail below in connection with FIG. 3, the present invention employs a combination of multipliers and adders that implement a matched filter based on canonical signed digit (CSD) technique.

Due to the multi-path nature of the channel, the energy of the receive signal is typically characterized by multiple peaks. Fine timing block 210 performs a windowing operation on the correlation values that are supplied by the output of correlator 204 to capture the window of time Max_Indx within which the correlation values are at their maximum. This indicates the optimum time window wherein the maximum amount of channel energy is detected. The width of this window may or may not be equal to the length parameter of the channel time response used to compute the weighing matrix. The signal Max_Indx is used to time the loading of the correlator output that is stored in memory 208 (ChE-In) into weighing matrix block 212. Weighing matrix block 212 in turn performs the matrix multiplication between the correlator output ChE_In and the matrix NH of weighing factors. The matrix NH accounts for the finite time response of the channel and the position of zero sub-carriers in the frequency domain. In a specific exemplary embodiment, estimator module 202 operates on two 14-sample channel estimates from the training sequence. The weighing matrix NH is thus a 14×14 matrix that may be stored inside block 212. The output of weighing matrix block 212 provides the channel estimates ChE_Out. MUX 214 first outputs the channel estimates ChE_Out and then the payload data is made available at the output (OUT) with some latency (through delay unit 200) as controlled by a MUX control signal supplied by control unit 206.

FIG. 3 is a simplified block diagram showing an exemplary implementation for correlator 204. In this example, correlator 204 includes a shift register 300 made up of, for example, 64 flip flops FF0–FF63 that receives the input signal Rx_DATA at input IN. The outputs of flip flops FF0–FF63 are applied to a multiplier block 302 that includes a respective series of complex CDS multipliers C0–C63 as shown. Multipliers C0–C63 generate output signals that are then summed together by a series of adders 304 as shown. The outputs of adders are then combined by a block 306 to generate the final output of the correlator.

The present invention thus provides various methods and systems that efficiently implement broadband multi-carrier communication systems. Time domain processing of channel estimation according to the present invention results in reduction in complexity in channel equalization. While the above provides a detailed description of certain specific embodiments of the invention, various alternatives, modifications and equivalents are possible. For example, a number of different memory resources, whether integrated within the estimator or separately provided, can be used for storage of data in the various stages within channel estimator module 202. This includes memory 208 that stores correlator outputs, block 212 that stores weighing matrix NH, etc. It is further to be understood that the various functional blocks in channel estimator 102 may be implemented by a combination of hardware and/or software, and that in specific implementations some or all of the functionality of some of the blocks may be combined. Also, while the channel estimation and equalization technique described herein is particularly well suited for wireless communication systems using OFDM, similar advantages can be realized when applying the same to wireline systems, and in general any system requiring equalization replying on a known training sequence for channel estimation. The scope of the present invention is thus not limited to the specific embodiments described, and is instead defined by the following claims and their fill breadth of equivalents.

What is claimed is:

1. A method for processing a multi-carrier signal transmitted across a channel, comprising
receiving the multi-carrier signal in time-domain;
estimating a channel transfer function using a subset of the multi-carrier signal in time-domain to provide a plurality of channel estimates;

transforming the multi-carrier signal and the plurality of channel estimates from time-domain into frequency-domain to provide a transformed multi-carrier signal and a plurality of transformed channel estimates; and compensating the transformed multi-carrier signal for channel effects using the plurality of transformed channel estimates.

2. The method of claim 1 wherein the subset of the multi-carrier signal in time-domain comprises training sequence.

3. The method of claim 2 wherein the estimating step comprises performing a convolution of the training sequence.

4. The method of claim 3 wherein the estimating step further comprises processing a weighing matrix in time domain.

5. The method of claim 4 wherein the processing of the weighing matrix comprises performing a multiplication of the weighing matrix with the convolved training sequence.

6. The method of claim 5 wherein the weighing matrix comprises values that account for a finite time response of the channel and a position of zero sub-carriers in the frequency domain.

7. The method of claim 3 wherein the convolution is performed as a non-cyclical convolution.

8. The method of claim 5 wherein the estimating step further includes determining an optimum time window within which the multiplication of the weighing matrix occurs.

9. The method of claim 1 wherein the multi-carrier signal is developed using orthogonal frequency division multiplexing.

10. The method of claim 9 wherein the channel comprises a wireless multi-path channel.

11. A channel estimation method comprising:
receiving a time-domain multi-carrier signal representing a channel training sequence;
performing a cyclic convolution function on the training sequence;
extracting a time window within which the received signal has an optimum amount of energy; and
multiplying a weighing matrix with the convolved training sequence to arrive at channel estimates, wherein, the multiplying occurs during the time window extracted by the extracting step.

12. The channel estimation method of claim 11 wherein the weighing matrix comprises values that represent an amount of non-zero time samples of an impulse response of the channel.

13. A method for communicating data between a transmitter and a receiver separated by a channel, the method comprising:
at the transmitter end:
generating a plurality of modulated sub-carrier signals based on the data;
transforming the plurality of modulated sub-carrier signals into a plurality of time-domain signals;
transmitting the plurality of time-domain signals across the channel as a multi-carrier signal; and
at the receiver end:
receiving the multi-carrier signal in time domain;
estimating a channel transfer function using a subset of the multi-carrier signal in time-domain to provide a plurality of channel estimates;
transforming the multi-carrier signal and the plurality of channel estimates from time-domain into frequency-domain to provide a transformed multi-carrier signal and a plurality of transformed channel estimates; and
compensating the transformed multi-carrier signal for channel effects using the plurality of transformed channel estimates.

14. The method of claim 13 wherein the estimating comprises performing a cyclic convolution on a training sequence embedded in the subset of the multi-carrier signal in time-domain.

15. The method of claim 14 wherein the estimating further comprises multiplying a weighing matrix with the convolved training sequence.

16. The method of claim 15 wherein the step of multiplying occurs at a window of time during which the multi-carrier signal has optimum energy.

17. In a multi-carrier data communication system, a receiver comprising:
a channel estimator that receives a multi-carrier time-domain signal at an input and generates a plurality of channel estimates at an output;
a time-domain to frequency-domain transform unit coupled to the output of the channel estimator and configured to convert the multi-carrier time-domain signal and the channel estimates from time-domain into frequency-domain; and
an equalizer coupled to an output of the transform unit and configured to compensate the multi-carrier signal for channel effects using the channel estimates.

18. The receiver of claim 17 wherein the channel estimator comprises:
a correlator coupled to receive a training sequence embedded in the multi-carrier time-domain signal, and configured to perform a convolution operation on the training sequence; and
a multiplier coupled to the correlator and configured to multiply a channel estimation weighing matrix with an output of the correlator.

19. The receiver of claim 18 wherein the channel estimation weighing matrix comprises values that account for a finite time response of the channel and a position of zero sub-carriers in the frequency-domain.

20. The receiver of claim 19 wherein the estimator further comprises a timing circuit coupled to the correlator and the multiplier, and configured to extract an optimum time for the multiplication performed by the multiplier.

21. The receiver of claim 20 wherein the correlator comprises a matched filter that performs a cyclic convolution.

22. The receiver of claim 21 wherein the matched filter is also configured to acquire timing of received signal for synchronization purposes.

23. The receiver of claim 20 wherein the estimator further comprises a memory unit coupled to the correlator and configured to store the output of the correlator.

24. The receiver of claim 23 wherein the estimator further comprises:
a delay unit having an input coupled to the input of the channel estimator and an output; and
a multiplexer having a first input coupled to the output of the delay unit, a second input coupled to an output of the multiplier, a control input and an output,
wherein, the multiplexer is configured to combine a payload portion of the multi-carrier time-domain signal with the plurality of channel estimates.

25. The receiver of claim 17 wherein the time-domain to frequency-domain transform unit is configured to perform a fast Fourier transform function.

26. A multi-carrier data communication system comprising:
- a transmitter including:
  - a modulator/deserializer configured to convert an input data stream into a plurality of modulated sub-carrier signals;
  - a frequency-domain to time-domain converter having an input coupled to the modulator/deserializer and configured to transform the plurality of modulated sub-carrier signals from frequency-domain into time-domain at an output;
  - a guard period insertion block coupled to the frequency-domain to time-domain converter and configured to insert a guard period in the output of the frequency-domain to time-domain converter;
  - a serializer coupled to an output of the guard period insertion block and configured to perform a parallel to serial conversion to provide a digital multi-carrier signal; and
  - a digital-to-analog converter coupled to the serializer and configured to convert the digital multi-carrier signal into an analog multi-carrier signal and to transmit the analog multi-carrier signal across a channel; a receiver including:
- an analog-to-digital converter coupled to receive the analog multi-carrier signal and configured to convert the analog multi-carrier signal into a digital multi-carrier signal;
- a deserializer coupled to the analog-to-digital converter and configured to convert the digital multi-carrier signal into a plurality of parallel signals;
- a channel estimator coupled to the deserializer and configured to derive channel estimates using a training sequence embedded in the analog multi-carrier signal;
- a guard period removal block coupled to an output of the channel estimator and configured to remove the guard period;
- a time-domain to frequency-domain converter coupled to an output of the guard period removal block and operating to provide a parallel plurality of received sub-carrier signals;
- an equalizer coupled to the time-domain to frequency-domain converter and configured to equalize the parallel plurality of received sub-carrier signals using the channel estimates; and
- a serializer/demodulator coupled to an output of the equalizer and configured to generate an output data stream.

27. The data communication system of claim 26 wherein the channel estimator comprises:
- a correlator coupled to receive a training sequence embedded in the plurality of parallel signals, and configured to perform a convolution operation on the training sequence; and
- a multiplier coupled to the correlator and configured to multiply a channel estimation weighing matrix with an output of the correlator.

28. The receiver of claim 27 wherein the channel estimator further comprises a timing circuit coupled to the correlator and the multiplier, and configured to extract an optimum time for the multiplication performed by the multiplier.

29. The receiver of claim 28 wherein the correlator comprises a matched filter that performs a cyclic convolution.

30. The receiver of claim 29 wherein the matched filter is also configured to acquire timing of the received signal for synchronization purposes.

* * * * *